United States Patent [19]

Carlton

[11] 4,330,340
[45] May 18, 1982

[54] PROCESS TO RECYCLE BITUMINOUS ROOFING REFUSE INTO SOLID FUEL AND OTHER ENERGY-RELATED PRODUCTS

[76] Inventor: Wayne H. Carlton, P. O. Box 1000, Englewood, Colo. 80110

[21] Appl. No.: 145,314

[22] Filed: Apr. 29, 1980

Related U.S. Application Data

[63] Continuation-in-part of Ser. No. 878,951, Mar. 7, 1978, abandoned.

[51] Int. Cl.$^3$ .............................................. C08L 95/00
[52] U.S. Cl. .................................... 106/281 R; 44/19; 44/23; 106/282
[58] Field of Search .......................... 106/281 R, 282; 427/345; 162/171; 44/61; 209/11

[56] References Cited

U.S. PATENT DOCUMENTS 3,650,396  3/1972  Gillespie et al. ...................... 209/11
3,725,262  4/1973  Mattice et al. ...................... 210/42 S Primary Examiner—John Kight, III
Assistant Examiner—Amelia B. Yarbrough

[57] ABSTRACT

A method and apparatus for separating roofing refuse into its components for recycle into four valuable products (a) solid fuel (b) solid bitumen (c) bitumen coated aggregates (d) sheetmetal scraps.

The refuse which contains fibrous paper pulp, bitumens, mica, various types of aggregates, sheetmetals, etc., is first sized, then immersed in hot liquefied bitumens during a heat controlled separation process, after which, the components are mechanically extracted, compacted, allowed to cool to ambient temperature and packaged separately.

1 Claim, 1 Drawing Figure

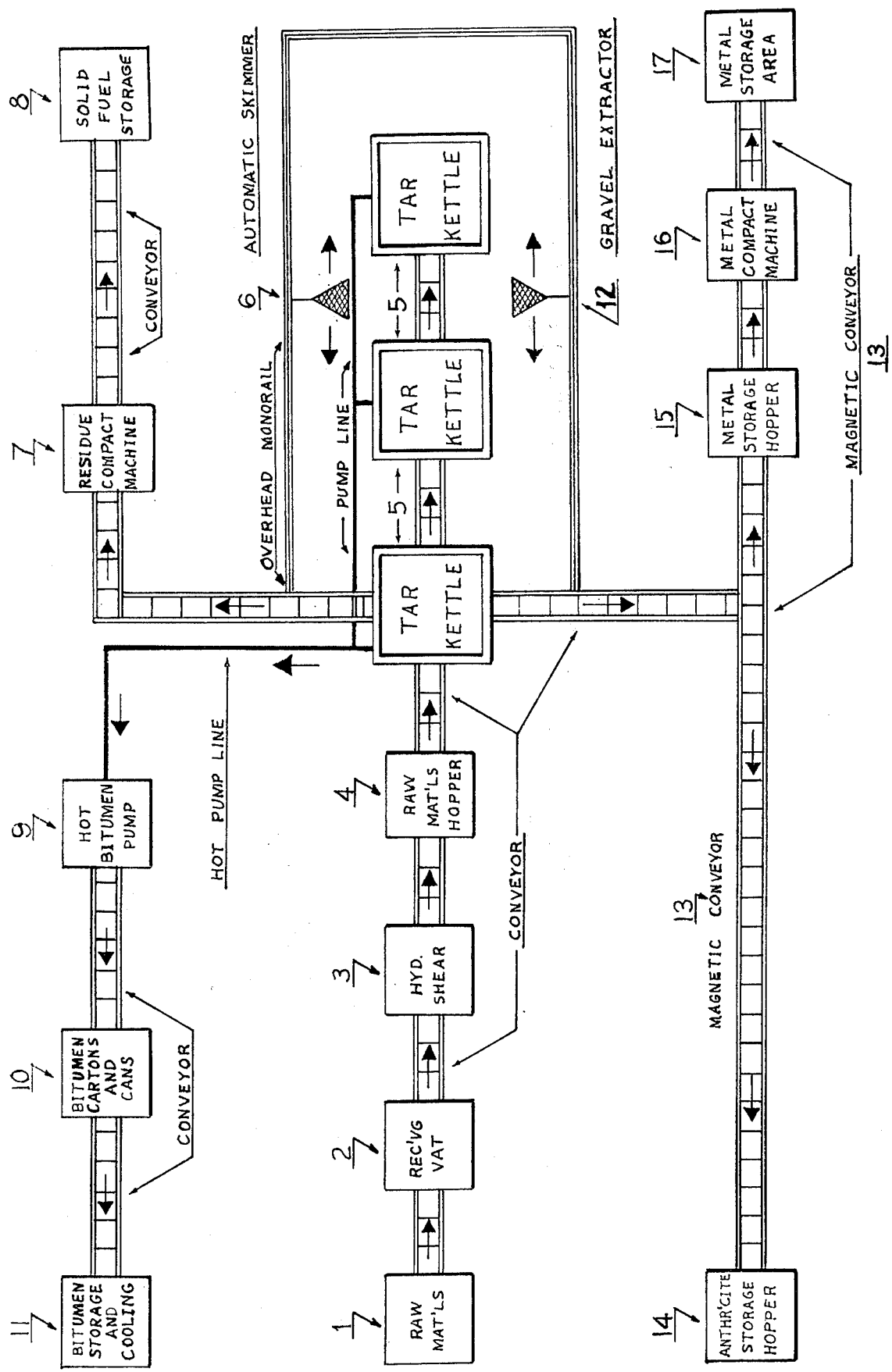

PROCESS TO RECYCLE BITUMINOUS ROOFING REFUSE INTO SOLID FUEL AND OTHER ENERGY-RELATED PRODUCTS

This is a continuation-in-part of application Ser. No. 878,951 filed Mar. 7, 1978, now abandoned.

BACKGROUND OF INVENTION

1. Field of the Invention

This invention relates to the conservation of energy and the production of a new source of energy. In one of its aspects it relates to the separation of bitumen saturated fibrous paper pulp from roofing refuse and recycling it into a solid fuel. This solid fuel is further enhanced by the introduction of a high-grade coal-dust particulate to the fuel mixture during the recycling process.

2. Description of the Prior Art

The prior art was to dispose of roofing refuse as solid waste. Solid waste disposal has been recognized more recently as a critical problem of an affluent society. In many cities, land simply is not available for continued dumping of refuse. In many areas, valuable flood plains are being filled in, giving rise to the spector of catastrophic floods in years to come. In other areas, valuable water lands are being filled in with refuse with the result that valuable recreation facilities may be lost to future generations who may live in an overcrowded world. In addition, these filling practices often upset the ecology of an area and such action may ultimately adversely affect our own well-being.

One of the major contributors to the solid waste problem is construction debris, notably roofing refuse, aggregates and metals. One of the long range problems with large volumes of bituminous roofing materials is the possibility of depleting our natural resources which are used in their manufacture, especially oil. Such resources are also used for other important products which are now or may in the future be essential to maintain the strategic health and welfare of our society.

This invention will help alleviate some of these problems by recycling the waste products so that new products can be made from the old ones. One important aspect is that a new energy-producing solid fuel will recycled from waste. In addition, other energy-related by-products will be developed for use in diverse products. For example, bitumen coated aggregates will be recycled and is used extensively in highway roadbed, surfacing and paving operations. Also, excess solid bitumens yielded in one phase of the process will be needed and used in another part of the process and the excess, if any, could be used in new roofing operations, the manufacture of paints and roof coatings, waterproofing coumpounds and road paving compositions. The sheet-metal scraps recovered can be further recycled into new useful metal products.

The two principal refuse materials to be used in the recycling process are specification type built-up roofing and composition type shingles. Pursuant to the U.S. Department of Commerce, Bureau of the Census publication MA-29-A(76)-1 issued May 1977, describing the yearly quantity of asphalt roofing products manufactured from 1967 to 1976, approximately 70 to 100 million squares to built-up roofing products are sold annually. It is estimated that 40% to 45% is used for the purpose of re-roofing. Based upon the above figures, approximately 4 million tons of roofing refuse and 8 million tons of bitumen coated aggregates are discarded as waste each year. The Department of Commerce publication also reports that approximately 63 million squares of asphalt shingles are sold each year. It is estimated that approximately 65% of these shingles are sold for the purpose of re-roofing. Again, using the above figures, approximately 5½ million tons would be discarded as waste each year. This means that approximately 10 million tons of valuable roofing refuse and 8 million tons of valuable bitumen coated aggregates are being wastefully discarded each year. The great majority of these materials are being replaced and discarded in the major metropolitan areas of the United States. A city of 250,000 population would support a single recycling plant. A metropolis would support two or more and so-called megapolis areas like the northeastern United States, Chicago or Los Angeles areas, would support several recycling plants.

The U.S. Congress will be asked to consider legislation to reclassify petro-chemical based bituminous roofing refuse as a strategic material and impose a moratorium on the continued destruction and disposal of these useful and valuable materials, Governors of the several states, county officials and mayors, would be requested to stockpile these materials at their various landfills and dumpsites until such time as they can be collected for recycling.

OBJECTS

By various aspects of this invention, one or more of the following, or other objects can be obtained.

It is an object of this invention to provide a method and apparatus to recover a valuable bitumen saturated fibrous paper pulp from roofing refuse and combining this product with a high-grade coal-dust particulate to form a solid fuel.

It is another object of this invention to provide an economical and simple method of separating and recovering the excess solid bitumens from roofing refuse.

It is yet another object of this invention to provide an economical method and apparatus for sorting and recovering the bitumen coated aggregates from the roofing refuse.

It is a further object of this invention to provide an economical and simple method of mechanically recovering and hand separating the various disimilar metal scraps recovered from the roofing refuse.

Other aspects, objects, and the several advantages of this invention are apparent to one skilled in the art from a study of this disclosure, the drawings and the appended claims.

BRIEF SUMMARY OF THE INVENTION

The main innovative characteristic of the invention is the creation of a new source of energy from discarded waste. The new energy source is obtained during the process by recovering a valuable bitumen saturated fibrous paper pulp which is compacted while hot into a solid block of fuel. The ignition quality and b.t.u. producing capability of the fuel is even further enhanced by the introduction of another waste product (a high-grade coal-dust particulate) which is thoroughly mixed in with the hot pulp fuel mix prior to its compaction.

The second most innovative characteristic of the invention is the recovery of a valuable bitumen coated aggregate. Coated aggregates of this type are used extensively in the construction of highway roadbeds, surfacing and paving operations.

The recovery of excess solid bitumens and sheetmetal scraps are coincidental to the process and their value and simplicity of recovery make the effort worthwhile.

BRIEF DESCRIPTION OF THE DRAWINGS

The invention will now be described with reference to the accompanying drawings which illustrates the full embodiment of the invention.

DETAILED DESCRITPION OF THE PREFERRED EMBODIMENTS

Referring now to the drawings, there is shown a typical plant and equipment layout that will be required in the process of sorting, sizing, separating, recovering and recycling roofing refuse into a valuable (a) solid fuel (b) solid bitumen (c) bitumen coated aggregates (d) sheetmetal scraps.

The two principal types of roofing refuse that are readily available in large quantities are specification type built-up roofing refuse (referred to herein as TYPE I REFUSE) and composition shingles (referred to herein as TYPE II REFUSE). Step one below (1 thru 10) deals with the separation of bituminous saturated fibrous paper pulp and the recycling of these materials into a solid fuel. Step one (1 thru 10) is identical for TYPE I and TYPE II refuse. The entire process for TYPE II refuse is complete at this point. TYPE I refuse is further processed through steps two, three and four below (11 thru 24).

Roofing refuse (1) is fed from the receiving vat (2) and conveyed to the hydraulic shear (3) where it is sized into approximately 12"squares and conveyed to the raw materials hopper (4). The gas fired bitumen kettles (5) are prefilled with hot liquefied bitumens to the proper level and maintained at at temperature of 500 degrees F. The feed in the hopper (4) is fed into the bitumen kettles (5) as needed. The introduction of the raw feed will cause the temperature of the hot bitumens to drop to approximately 350 degrees F. and the heat controlled process must continue until the temperature again reaches 500 degrees F. During this heat controlled process, the roofing refuse begins to melt and separate. A floating action takes place where the fibrous paper pulp floats to the top of the kettle vat (5) and the heavier metals and aggregates drop to the bottom of the kettle vats. Step one of the separation process, is to mechanically extract the bitumen saturated fibrous paper pulp by means of an automatic skimmer (6) where it is then conveyed to the batching machine (7) which is located directly under the gravity fed coal-dust hopper (8) which contains the high-grade coal-dust particulate that will be fed as needed into the batching machine (7) below where it is thoroughly mixed with the hot bitumen saturated fibrous paper pulp. It is then conveyed to the solid fuel compactor (9) where the fuel mixture is compacted while hot into approximately 12"cubes. It is then conveyed to the packaging and labeling machine (10) where it is wrapped in a waxed cardboard container, labled and stored in the solid fuel storage area (11). Step two, in the separation process, is to remove the excess bitumens from the kettle vats (5) by means of a hot bitumen pumping system (12) where they are fed into waxed cardboard or metal containers (13) and then conveyed to the bitumen storage area (14) and allowed to cool to ambient temperature and stored. It is important to note here, that TYPE I refuse, will yield an excess of bitumens whereas TYPE II refuse, will have a minus yield, requiring the addition of bitumens during the above process in order to resaturate themselves. Depending upon the quantity of each type of refuse processed there will either be an excess or minus overall yield of bitumens. Step three, in the separation process, is to remove the bitumen coated aggregates by means of an aggregate extractor (15) to the loading area (16) of the 2-tiered (over & under) conveyor system (17 & 18). The upper conveyor (17) is equipped with a $\frac{1}{4}''$ to $\frac{3}{4}''$ grid-steel mesh conveyor belt. The lower conveyor (18) is equipped with a one piece composition type belt. Both the upper & lower conveyors are equipped with a vibrating mechanism. The upper conveyor (17) only, is equipped additionally with a magnetic mechanism. When the aggregates are removed from the kettle vats and loaded onto the 2-tier system, they will be exposed to the surrounding air and affected by a chill factor. The chill factor will cause the aggregates to adhere to one another. This problem will be eliminated by loading the hot aggregates upon the vibrating upper conveyor belt (17) which vibrates and sifts the aggregates causing them to pass through the steel mesh grid belt down to the lower conveyor (18) composition belt where the vibrating action is continued. It is anticipated that a small amount of drippings of hot bitumens will also pass from the upper conveyor to the lower conveyor belt, causing some of the aggregates to adhere to the belt. This will be eliminated by the installation of commercially available spray misting devices (19) at pre-determined locations on the lower conveyor (18). The spray misting devices (19) will issue a mist of kerosene on the belt and the aggregates. The kerosene will cause the adhesive qualities of the bitumens to break down releasing the aggregates and bitumens from the belt. It is further anticipated that the vibrating action of the conveyors will cause some of the aggregates to bounce into the air. To avoid the nusiance of these particulates scattering about the conveyors, a small lightweight sheetmetal hood (20) will be installed beyond the loading area of the upper conveyor and along the sides only of the lower part of the 2-tier system. The lower conveyor (18) continues from the end of the 2-tier system, on to the aggregate storage hopper (21). This portion of the lower conveyor will have the complete hood installed over it. The upper conveyor (17) continues from the end of the 2tier system on to the metal storage hopper (22) and no hood will be required over this section of the upper conveyor. After reaching the lower conveyor belt the aggregates will continue on to the aggregate storage hopper (21) where they will be stored. Step four, in the separation process, occurs when the aggregates and metals are removed from the kettle vats (5) and placed upon the loading area (16) of the 2-tier conveyor system and the metal scraps are magnetically retained on the upper conveyor (17) and allowed to continue on to the metal storage hopper (22) where they are held and fed as needed to the hand separation table (23) where the various disimilar metals (tin, lead, copper, aluminum, steel, galvanized and others) are hand separated and then placed upon the conveyor and conveyed on to the metal compactor (24) where the metals are compacted into approximately 12" cubes and then stored in the metal storage area (25). This completes the PROCESS TO RECYCLE BITUMINOUS ROOFING REFUSE INTO SOLID FUEL AND OTHER ENERGY-RELATED PRODUCTS.

I claim:

1. The new recycling process designed to separate and recover four reusable products from bituminous roofing refuse, comprising:
   (a) sizing the feed into approximately 12" squares,
   (b) heating the materials to a temperature of 500 degrees F.,
   (c) skimming-off the floating bitumen saturated fibrous paper pulp,
   (d) adding a high-grade coal-dust particulate to the hot pulp mix in (c) above, thoroughly mixing the two prior to compaction,
   (3) pumping-off the excess hot liquefied bitumen, and
   (f) mechanically recovering and separating the bitumen coated aggreagates, and
   (g) mechanically recovering and hand-separating the disimilar metal scraps, and
   (h) packaging separately each of the above four products separated in c+d, e, f and g, above.

* * * * *